US005099572A

United States Patent [19]

Lazaro, Jr. et al.

[11] Patent Number: 5,099,572

[45] Date of Patent: Mar. 31, 1992

[54] METHOD OF ASSEMBLING AN ELECTRICAL CONNECTOR ASSEMBLY

[75] Inventors: Luis J. Lazaro, Jr., Seattle; Franklin D. Harsch, Renton, both of Wash.

[73] Assignee: The Boeing Company, Seattle, Wash.

[21] Appl. No.: 589,244

[22] Filed: Sep. 28, 1990

Related U.S. Application Data

[62] Division of Ser. No. 432,429, Nov. 6, 1989, Pat. No. 4,981,446.

[51] Int. Cl.[5] .............................................. A01R 43/04

[52] U.S. Cl. ........................................ 29/863; 29/859; 29/861; 439/460; 439/589

[58] Field of Search ........................ 29/830, 857, , 861, 29/863, 854, 862; 439/460, 589, 746

[56] References Cited

U.S. PATENT DOCUMENTS

| | | | |
|---|---|---|---|
| 3,980,380 | 9/1976 | Cleniawa et al. | 439/460 X |
| 4,659,164 | 4/1987 | Reuss | 439/460 X |
| 4,786,260 | 11/1988 | Spaulding | 29/861 X |

*Primary Examiner*—Carl J. Arbes

*Attorney, Agent, or Firm*—Conrad O. Gardner; B. A. Donahue

[57] ABSTRACT

An electrical connector modularly arrayed for ease in manual and automatic fabrication and assembly of wire bundle assemblies. Increased structural strength, elimination of snap ring, straight bore inside diameter, the addition of an insert alignment key, and elimination of electrical contact retention clips are features of the present modular electrical connector assembly.

1 Claim, 2 Drawing Sheets

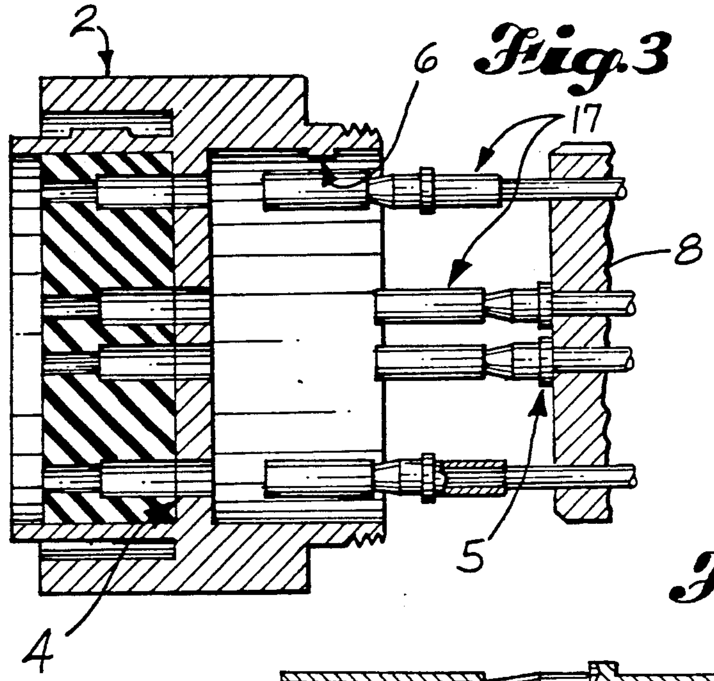
Fig.3
Fig.6
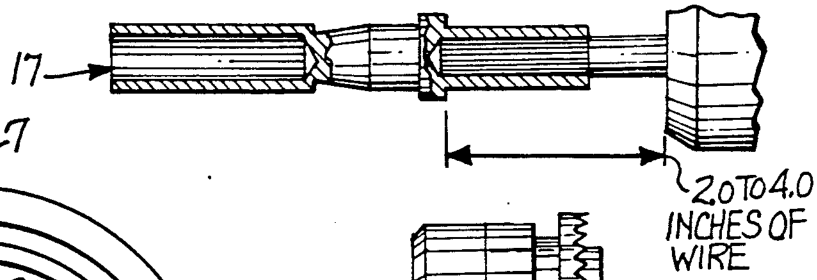
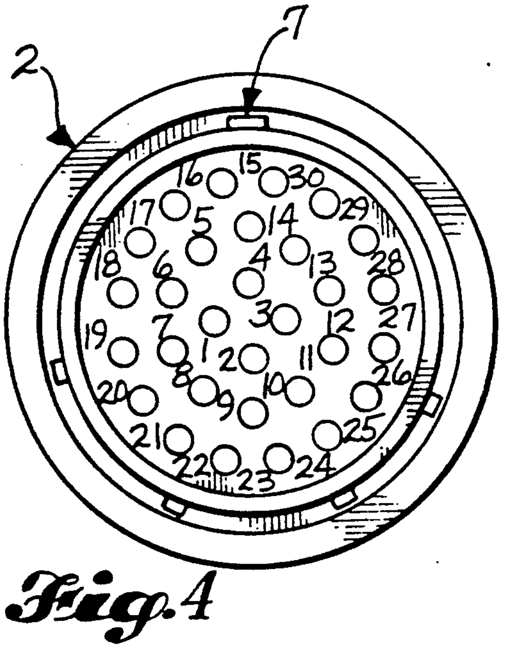
Fig.4
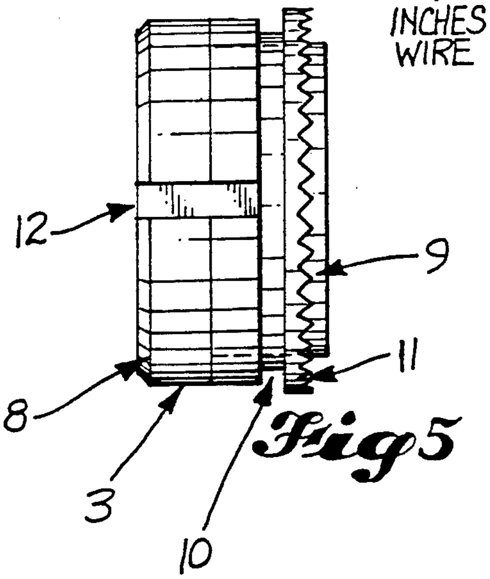
Fig 5

METHOD OF ASSEMBLING AN ELECTRICAL CONNECTOR ASSEMBLY

RELATED APPLICATIONS

This application is divisional of Ser. No. 07/432,429 filed on Nov. 6, 1989 now U.S. Pat. No. 4,981.446 issued Jan. 1, 1991.

BACKGROUND OF THE INVENTION

This invention relates to circular electrical connectors and more particularly to a circular electrical connector assembly resistant to hostile, external, ambient environments.

Past efforts have been precluded due to high cost of connector assemblies brought on by technical problems associated with the contact insertion process of the assemblies due to e.g.:

uncontrolled (different) insertion depth of various types of circular connectors;

great difficulty in indexing hole patterns of the connectors;

problems associated with the use of filler rods and spare contacts;

the diversity of contact styles and sizes; and, the presence of tolerance variation between the connector grommet and dielectric.

Current processes in connector assembly typically include: stripping wires, crimping electrical contacts to the wires, and inserting the contacts into the connector and installing backshell hardware. In summary, the connector assembly can best be described as an individual segment of the wire bundle assembly which includes stripping, crimping, and insertion. Assembly of the electrical contacts to the connector requires the use of insertion tools (loading) or extraction tools (removal). The close proximity of the electrical contacts and the diversity in contact styles and sizes complicates this process. An added complexity is the requirement of the prevention of injury to the operator, viz., a device such as a vise is required to hold down the connector before insertion of the contacts into the connector. Such arrangements and methods are tedious, labor intensive, and can result in rework if the coupling ring of the connector gets damaged in the clamping process.

SUMMARY OF THE INVENTION

Accordingly, it is an object of the present invention to provide a circular electrical connector which is resistant to undesirable external environmental conditions, and of modular configuration, which is compatible with automated design, manufacture, and assembly thereof.

A further object of the present invention includes a circular modular connector assembly characterized by elimination of the electrical contact insertion process and related tooling (insertion/extraction tools) used in the assembly of the connector thereby enabling simplified, cost effective automation and robotic fabrication and assembly of electrical/electronic wire bundle assemblies.

It is yet another object of the present invention to provide a circular modular type connector which is intermatable with prior connectors (such as type Mil-C-26500, Mil-C-83723, Mil-C-38999, and Mil-C-5015 connectors).

BRIEF DESCRIPTION OF THE DRAWINGS

FIG. 3 is an illustration, similar to that shown in FIG. 1 but with components labeled, and wired electrical contacts 17 shown at their fixed location, i.e., contacts 17 are nested 5 against the grommet dielectric 8 face and wired contacts 17 are shown at their free length position;

FIG. 4 is an end view of the connector further showing by way of illustration the plug or receptacle face. The master key on the plug or keyway 17 on the receptacle is highlighted;

FIG. 5 is a side elevation of the grommet assembly 3; and,

FIG. 6 is a cross section of wired electrical contacts 17 illustrating the requirement, for free wire length.

DETAILED DESCRIPTION OF THE INVENTION

Figure 1:
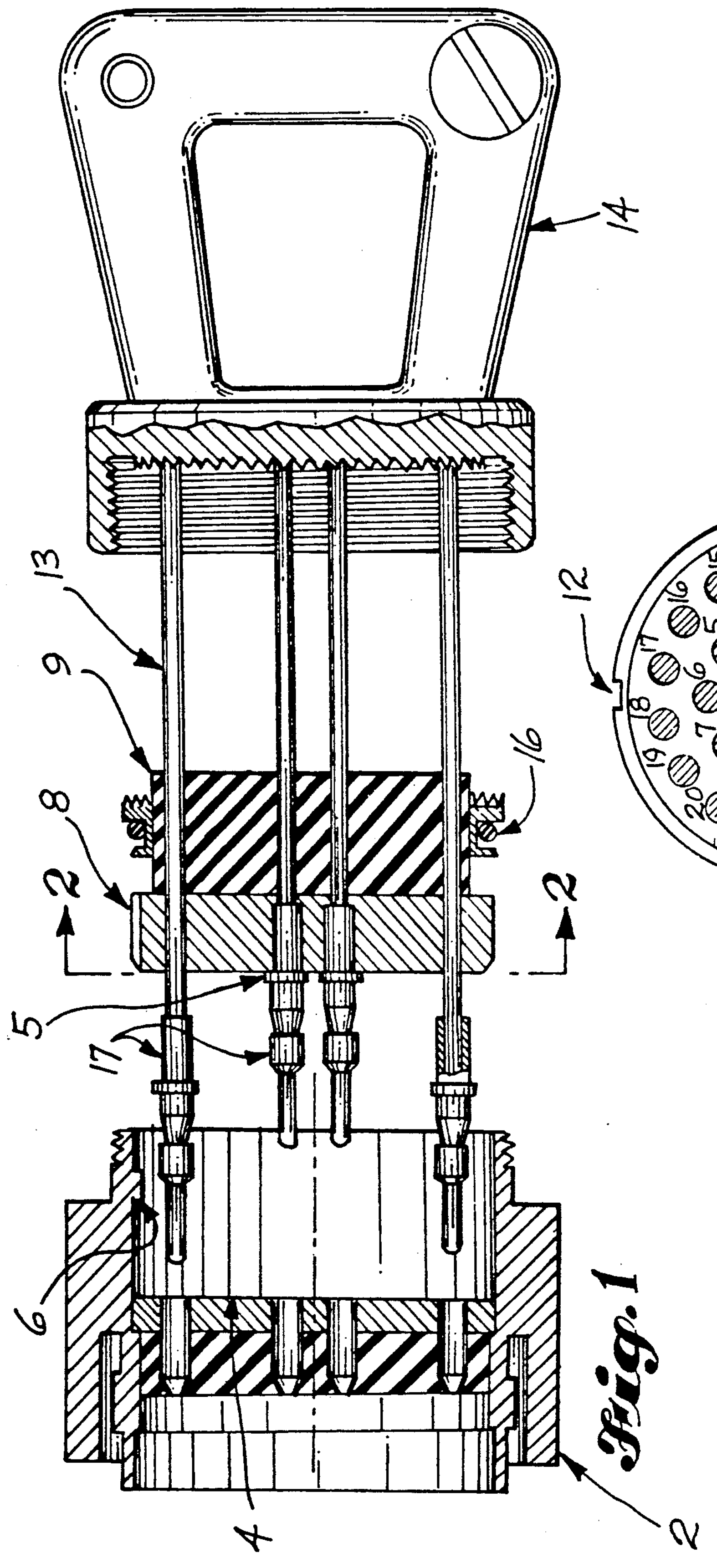
FIG. 1 is a cross sectional view which illustrate the assembly of the present modular connector, and included in the illustration is a connector cable clamp or backshell 14, and the further showing of a wired grommet assembly 3 being loaded onto a connector shell 2.
Figure 2:
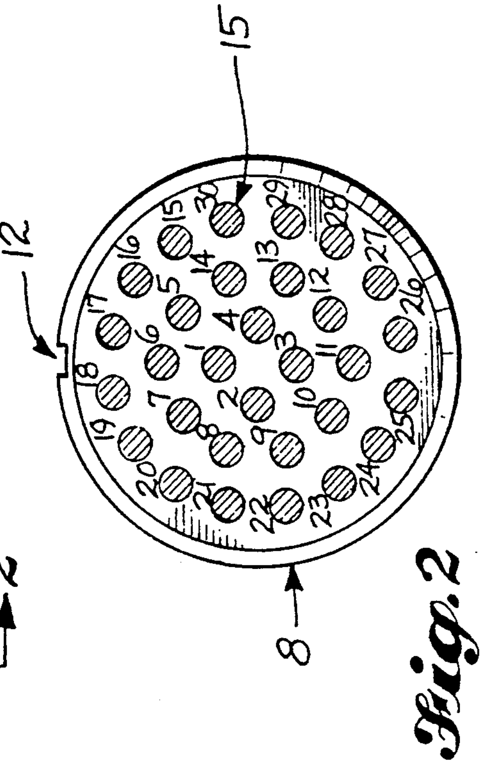
FIG. 2 is the end view (face) of the grommet dielectric 8 illustrating the contact arrangement of the connector of which individual holes 15 are numbered for proper wiring.

The present electrical, circular, environment resisting connector utilizes a modular construction consisting of a connector shell 2 and a grommet assembly 3. Included in the illustration at FIG. 1 is a connector cable clamp or backshell 14 and a wired grommet assembly 3 being loaded onto a connector shell 2. FIG. 2 shows the grommet dielectric 8 illustrating contact arrangement of the connector of which individual holes 15 are numbered for proper wiring. In FIG. 3, wired electrical contacts 17 are shown at their fixed location, i.e., contacts are nested 5 against grommet dielectric 8 face. The master key (on the plug) or keyway (on the receptacle) 7 can be seen in FIG. 4. Wired electrical contacts 17 are shown in FIG. 6 illustrating the requirement for 2–4 inches of free wire length. The construction of the connector shell 2 is similar to the present Mil-C-26500, Mil-C-83723, Mil-C-38999 and Mil-C-5015 connectors with the following differences:

(1) The connector wall is about 0.020 inches thicker for improved strength;

(2) There is cut-down on thickness of dielectric 4;

(3) Snap ring which is used to hold down the insert assembly is eliminated;

(4) The inside diameter is simplified to a straight bore, and an alignment key 6 is added, the alignment key 6 being positioned directly on the opposite end of the master key or keyway 7 of the connector as shown in FIG. 4.

The grommet assembly 3, as shown in FIG. 5, consists of a grommet dielectric 8, grommet 9 and a pressure ring 10 with an O-ring 16, 0.070 inches in diameter, for environmental sealing and MS 3155 accessory teeth 11 functioning as an integral part. The grommet assembly has a keyway 12 located at the same axis as the alignment key 6 on the connector shell 2. The alignment key 6 is designed to be dimensionally located with respect to the keyway 12 without much interference in order to reduce a potential wearing condition.

The assembly process (automatic or manual) includes the following method steps:

(A) Wires 13 (as required ) are inserted through backshell hardware 14 (see FIG. 1).

(B) Push wires 13 through numbered holes 15 of the grommet assembly 3 with approximately 2–4 inches of free length (see FIG. 6).

(C) Strip all wires 13.

(D) Crimp electrical contacts 17 onto wires 13.

(E) Pull wire(s) 13 to nest contact shoulder 5 against grommet dielectric 8 portion of the grommet assembly 3.

(F) Align keyway 12 of grommet assembly 3 with alignment key 6 of the connector shell 2 and push grommet assembly 3 inside connector shell 2 until it bottoms. Contacts 17 can float (move) about 0.005 inches.

(G) Install backshell accessory 15 and apply torque as required.

Rework process (manual) is as follows:

(A) Loosen backshell accessory 15 and push back.

(B) Pull out grommet assembly 3.

(C) Push out wire(s) 13 (needed to be reworked) approximately 2–4 inches of free length from the face of the grommet assembly 3.

(D) Repeat steps C thru G (as required).

The present modular electrical connector assembly enables automated assembly and as can be seen from the preceding detailed description provides among others, the following features and advantages:

Elimination of the electrical contact insertion process and related tooling such as insertion and removal tools in the assembly of the connector.

Inhibits costly connector assembly on both labor and material waste.

Provides increased connector assembly reliability such as, elimination of unseated electrical contacts, cross wiring and others.

Enables improved operator (personnel) safety due to elimination of insertion tool.

We claim:

1. The method of assembling an electrical connector assembly comprising the steps of;

inserting a plurality of wires 13 through backshell 14;

pushing said plurality of wires 13 through numbered holes 15 of a grommet assembly 3 leaving about 2 to 4 inches of free length;

stripping said plurality of wires 13;

crimping a corresponding plurality of electrical contacts 17 onto said plurality of wires 13;

pulling said plurality of wires 13 to nest electrical contact 17 shoulders against the grommet dielectric portion of said grommet assembly 3;

align the keyway 12 of said grommet assembly 3 with the alignment key 6 of a connector shell 2 and push said grommet assembly 3 inside said connector shell 2 until said grommet assembly 3 bottoms out; and then install a backshell 14 and apply torque thereto.

* * * * *